Patented Nov. 29, 1932

1,889,130

UNITED STATES PATENT OFFICE

GORDON D. PATTERSON, OF WILMINGTON, DELAWARE, ASSIGNOR TO E. I. DU PONT DE NEMOURS & COMPANY, OF WILMINGTON, DELAWARE, A CORPORATION OF DELAWARE

STABILIZED COMPOSITION

No Drawing.     Application filed December 3, 1929.     Serial No. 411,389.

This invention relates to the art of pigmented compositions, and more particularly to the use of reactive basic pigments in vehicles containing base-sensitive polyhydric alcohol-polybasic acid resins.

By the term "reactive basic pigments", as used herein, I mean pigments which, before stabilization, contain more than 0.2% of acetic acid soluble components, calculated as the oxide.

By the term "zinc sulfide type pigments", as used herein, I mean pigments containing zinc sulfide with or without other pigments, such as barium sulfate or titanium oxide.

By the terms "stable", "stabilized", and "stabilization", as used herein in conjunction with reactive basic pigments and compositions containing them, I mean the condition of pigments of that type which have been treated to reduce the acetic acid soluble components, calculated as the oxide, to not more than 0.2%, and the condition of compositions containing said treated pigments.

By the term "reaction", as used herein, I mean the acidity or alkalinity of a pigment as indicated by thoroughly shaking, say 10 grams of the pigment with 50 cc. of fresh redistilled water at about 21° C., and determining the hydrogen-ion concentration, in terms of pH, of the water extract.

By the term "acetic acid soluble components", or its equivalent, as used herein, I mean relatively water insoluble substances of basic character, which are extracted by 10% acetic acid in 2 hours heating at 100° C.

By the term "base-sensitive polyhydric alcohol-polybasic acid resins", as used herein, I mean condensation products resulting from the interaction of one or more polyhydric alcohols, one or more polybasic acids, and one or more of the following ingredients, to-wit: drying oils, semi-drying oils, non-drying oils, monobasic or dibasic acids, especially those derived from drying oils, semi-drying oils, and non-drying oils, with or without other ingredients, such as natural resins and other synthetic resins, which condensation products have a tendency to thicken, liver or gel in the presence of reactive basic pigments.

By the term "thickening", as used herein, I mean an increase in consistency during grinding or on standing. Mere thickening can usually be overcome by thinning, although that may involve a change in solids content, or other factor, which will deleteriously affect the use of the material as a coating composition or plastic composition.

By the term "livering", as used herein, I mean a type of thickening which cannot be uniformly reduced by the addition of thinner.

By the term "gelling", as used herein, I mean a type of thickening which is characterized by non-flowing properties, elasticity, and the property of being susceptible of retaining its shape when parted by a sharp instrument.

In making enamels, paints or other coating compositions, as well as plastic compositions, containing polyhydric alcohol-polybasic acid resins, it has been found that instability often develops when certain pigments, for example ordinary zinc sulfide type pigments, are included in the pigment combination. This instability usually takes the form of thickening, livering or gelling, although it may also be manifested by non-uniformity, as by the formation of lumps or granules. In some cases instability develops shortly after the pigment is incorporated with the vehicle, for example during grinding. In other cases the freshly prepared composition appears perfectly normal but thickening, livering or gelling develops during subsequent storage of the product in the package. This thickening, livering or gelling is permanent and cannot be eliminated by stirring or by any known means which does not deleteriously affect the product for use as a coating composition. Such instability is frequently serious and prevents the use of reactive basic pigments with base-sensitive polyhydric alcohol-polybasic acid resins in which the use of these pigments is highly desirable.

I have discovered that this instability is due to the presence of excessive amounts of acetic acid soluble components and that it can be overcome by the substantial removal of these components as indicated hereinafter.

It is therefore an object of this invention to produce stable compositions from reactive basic pigments and vehicles containing base-sensitive polyhydric alcohol-polybasic acid resins.

It is a more specific object of this invention to produce stable coating compositions from zinc sulfide type pigments and vehicles containing base-sensitive polyhydric alcohol-polybasic acid resins.

With the above and other objects in view, which will be apparent as the description proceeds, I have set forth my invention in the following specification and have included the following examples of compositions embodying my invention by way of illustration and not as a limitation:

EXAMPLE 1

*White enamel*

| | Parts by weight |
|---|---|
| Stabilized lithopone | 42.0 |
| Resin A | 15.3 |
| Hi-flash naphtha | 10.5 |
| Mineral spirits | 32.0 |
| Cobalt linoleate | 0.2 |
| | 100.0 |

Resin A in the above composition had an acid number of 50 and was formed from the following ingredients, using the proportions indicated:

| | Parts by weight |
|---|---|
| Glycerol | 19.9 |
| Phthalic anhydride | 36.4 |
| Linseed oil acids | 31.2 |
| China-wood oil acids | 12.5 |
| | 100.0 |

The above enamel was prepared by grinding the pigment with a portion of the resin and solvent, subsequently adding the remainder of the composition, and finally reducing to application consistency with additional naphtha.

If ordinary commercial lithopone is substituted for the stabilized lithopone in the above composition, thickening and gelling will be encountered when the enamel ages in the package even at normal temperatures. This failure will develop very rapidly and to a marked degree if the package is stored at a temperature above normal room temperature, as, for example, near a steam radiator or near the ceiling of an overheated room.

When stabilized lithopone is used the product will be free from appreciable thickening, livering or gelling.

EXAMPLE 2

*White enamel*

| | Parts by weight |
|---|---|
| Stabilized lithopone | 42.5 |
| Asbestine | 4.3 |
| Varnish containing resin B | 53.2 |
| | 100.0 |

Resin B in the above composition had an acid number of 25 and was formed from the following ingredients, using the proportions indicated:

| | Parts by weight |
|---|---|
| Glycerol | 14.0 |
| Phthalic anhydride | 22.5 |
| Rosin | 54.9 |
| Run pontianic gum | 8.6 |
| | 100.0 |

The varnish was prepared by heating the following constituents at 277° C. until the composition reached the stringing point of general varnish practice, and reducing with solvent consisting of 50% hi-flash naphtha and 50% mineral spirits. If desired, drier can be added.

| | Parts by weight |
|---|---|
| Resin B | 41.0 |
| China-wood oil | 49.0 |
| Linseed oil | 10.0 |
| | 100.0 |

This enamel is free from appreciable changes in consistency on aging, but if ordinary commercial lithopone is substituted for the stabilized lithopone the resulting product is unstable.

EXAMPLE 3

*White paint*

| | Parts by weight |
|---|---|
| Stabilized 50% zinc sulfide lithopone | 50.0 |
| Resin C | 24.8 |
| Cobalt linoleate | 0.2 |
| Mineral spirits | 25.0 |
| | 100.0 |

Resin C in the above composition had an acid number of 15 and was formed from the following ingredients, using the proportions indicated:

| | Parts by weight |
|---|---|
| Glycerol | 17.1 |
| Phthalic acid | 27.1 |
| Linseed oil acids | 55.8 |
| | 100.0 |

This example illustrates the use of a lithopone higher than normal in zinc sulfide content. This composition is stable even under severe conditions.

Since resin C is on the border line of being a base-sensitive polyhydric alcohol-polybasic acid resin, however, the substitution of ordinary commercial lithopone for the stabilized lithopone, in conjunction with a normal ratio of pigment to binder, like the present one, produces a composition which is stable at room temperature but one which becomes unstable when subjected to abnormal temperature conditions, such as those indicated above.

Example 4

White paint

| | Parts by weight |
|---|---|
| Stabilized zinc sulphide | 50.0 |
| Resin C | 24.8 |
| Cobalt linoleate | 0.2 |
| Mineral spirits | 25.0 |
| | 100.0 |

This composition is stable even under severe conditions, but the substitution of unstabilized zinc sulfide for the stabilized zinc sulfide produces the same results, and for the same reason, as the substitution of commercial lithopone for stabilized lithopone in Example 3.

While the above examples are limited to zinc sulfide and zinc sulfide blended with barium sulfate, this method of avoiding instability applies to any reactive basic pigment, such as lithopones modified with titanium oxide. Other pigments than lithopone, such as Prussian blue, para toner red and carbon black, may also be present, provided these other pigments in themselves do not develop instability.

As additional examples of base-sensitive polyhydric alcohol-polybasic acid resins I mention the following:

Resin D (acid number 74)

| | Parts by weight |
|---|---|
| Glycerol | 24.20 |
| Phthalic anhydride | 54.30 |
| Castor oil | 21.50 |
| | 100.00 |

Resin E (acid number 20)

| | |
|---|---|
| Glycerol | 15.52 |
| Phthalic anhydride | 25.41 |
| Rosin | 59.07 |
| | 100.00 |

In addition, resins of the following types are subject to instability when used with abnormally large quantities of pigments, such as 3 parts by weight of pigment to 1 of binder, or under elevated temperature conditions:

Resin F (acid number 25)

| | Parts by weight |
|---|---|
| Glycerol | 20.37 |
| Phthalic anhydride | 37.34 |
| China-wood oil acids | 12.91 |
| Rosin | 29.38 |
| | 100.00 |

Resin G (acid number 36)

| | |
|---|---|
| Glycerol | 14.40 |
| Phthalic anhydride | 16.90 |
| China-wood oil acids | 22.90 |
| Run Congo | 45.80 |
| | 100.00 |

While no definite rules can be laid down as to the exact limits of the range of polyhydric alcohol-polybasic acid resins which are unstable, since this depends on several factors, I have found that resins which tend toward instability usually possess one or more of the following characteristics:

(a) High content of combined phthalic acid (b) Relatively high acid number (c) Presence of combined China-wood oil or China-wood oil acids (d) Presence of combined Congo resin.

Furthermore, I have also found that the instability of this type of resin varies with other factors, such as:

(e) Percentage of acetic acid soluble components of pigment (f) Absolute quantity of acetic acid soluble components of pigment (g) Temperature to which composition is subjected after manufacture.

The base-sensitive polyhydric alcohol-polybasic acid resins referred to above, as well as other resins of this type, in which other polyhydric alcohols, other polybasic acids, and other modifying ingredients than those indicated are used, may be made in any well known manner, as, for example, by heating the ingredients at any suitable temperature above their melting point until resinification is complete. In the preparation of resins of unusually light color it has been found preferable to carry out the reaction in the presence of an inert gas. If desired, refluxing may be resorted to or the operation may be carried out at elevated or reduced pressures. Where oil is used in place of oil acids, it is sometimes desirable, in order to obtain a homogeneous product, to heat the oil and polyhydric alcohol together before adding the polybasic acid. Other modifying ingredients, if used, may be added in either stage.

Although the thinner used in the above examples is limited to mineral spirits and hi-flash naphtha, other thinners, such as xylol and toluol, may be used. Likewise, although cobalt linoleate is referred to as the drier, other driers, such as lead and manganese driers, may be used. Furthermore, other well known ingredients of coating compositions and plastic compositions, such as fillers and softeners, may be added where desired.

*Stabilization.*—It is common knowledge that zinc oxide causes thickening or gelling when it is introduced into certain treated oils or varnishes, particularly bodied oils of high acid number and varnishes containing substantial quantities of China-wood oil. Accordingly, the use of zinc oxide is avoided in such systems. Lithopone, however, is normally stable and is used quite generally in such systems although it contains basic zinc compounds ordinarily ranging in amount from about 0.4 to 1.0% or higher, calculated as zinc oxide. It is therefore classed as an inert and stable pigment. However, I have found that the same pigment, when used with base-sensitive polyhydric alcohol-polybasic acid resins, induces the forms of instability already mentioned, and I originally considered this a characteristic of zinc sulfide itself, since these resins represented entirely new types of vehicles in which the behavior of pigments had not been investigated. In my further investigation, however, this difficulty was traced directly to the small amount of reactive zinc compounds present in this type of pigment, and I have discovered that the substantial elimination of these zinc compounds from zinc sulfide type pigments renders the latter stable with vehicles containing resins which normally develop instability when used with the unstabilized pigments. Similarly, the removal of the reactive or acetic acid soluble components from other reactive basic pigments also stabilizes them.

To effect stabilization the pigment may be treated in various ways. A preferred way is to give it an acid finishing treatment with a dilute acid or acidic reagent, such as acetic acid, citric acid, sulfuric acid or sodium bisulfate, to dissolve the reactive basic components, following the acid treatment with a washing treatment to remove the dissolved materials. As an alternative procedure, I may treat the pigment with an acid reagent to dissolve the reactive basic components and follow by adding a calculated quantity of a reagent designed to precipitate the dissolved base in an active form, for example, in the case of zinc sulfide pigments, I may treat with acid to dissolve the acetic acid soluble zinc and follow with a water wash to remove the dissolved zinc, or I may follow the acid treatment with the addition of a precipitating reagent, such as sodium sulfide, in amounts sufficient to precipitate the soluble zinc as inactive zinc sulfide.

As a specific example I recite the following:

Commercial zinc sulfide, which contained 1.34% acetic acid soluble zinc, reckoned as zinc oxide, was slurried in water, using 1 part of pigment to 10 parts of water. The slurry was acidified with dilute sulfuric acid, maintaining a pH of 3.8 for one hour with agitation. Washing by decantation was continued until the wash water showed a pH of 6.1 (the water used for wash water gave a pH of 6.2). A control analysis on a sample of the pigment after this wash showed 0.1% acetic acid soluble zinc, calculated as zinc oxide. This basic zinc content, being still higher than desired, a second acid treatment was performed in a manner similar to the first one, except that the slurry was acidified to a pH of 3.3. After the second washing operation, the pigment analyzed 0.041% acetic acid soluble zinc, calculated as zinc oxide, and gave a pH of 6.0. The material was then filtered, dried and disintegrated. Both the treated and untreated pigments were tested in base-sensitive polyhydric alcohol-polybasic acid resin vehicles. The compositions made from untreated pigment failed by thickening, whereas no appreciable thickening occurred when the stabilized pigment was used.

Ordinary lithopone contains reactive zinc compounds, calculated as zinc oxide, in variable amounts from 0.4 2%. I have found it necessary, however, in order to avoid instability in the systems containing zinc sulfide type pigments referred to herein, to maintain the reactive zinc content so that it is not more than 0.2%, and I prefer to maintain it substantially below 0.05%, calculated as zinc oxide. I also prefer to give the pigment an acid reaction and, when the pigment contains from 0.2 to 0.1% inclusive of acetic acid soluble zinc, reckoned as zinc oxide, to give it a reaction of substantially 6.0 pH; when it contains less than 0.1%, and more than 0.05%, of these ingredients, to give it a reaction of between 6.0 pH and 6.5 pH inclusive; and, when it contains no more than 0.05% of these ingredients, to give it a reaction of between 6.0 pH and 7.0 pH inclusive. Adjustment of the pH is preferably effected by adding the required amounts of acid, such as sulfuric acid, or alkali, such as sodium hydroxide, before filtering, at the finish of the stabilizing treatment. Where other reactive basic pigments are used, similar limits of acetic acid soluble components, calculated as the oxide, should be maintained. Similarly, I prefer to give these other basic pigments an acid reaction and maintain their pH within the ranges indicated for zinc sulfide type pigments.

While the mechanism by which reactive basic pigments cause thickening or gelling of coating compositions is not clearly understood, I believe the initial step is the combination of the reactive compounds, such as zinc hydroxide or carbonate in zinc sulfide type pigments, with acidic constituents of the vehicle. The resulting compounds appear to absorb, and therefore decrease the amount of, free liquid which normally contributes fluidity to the composition. The resulting swelling is manifested by thickening and, in many cases, by actual livering or gelling.

It will therefore be apparent that I have developed a new and useful type of non-thickening, non-livering and non-gelling composition which is highly valuable in all classes of coating compositions where the combination of base-sensitive polyhydric alcohol-polybasic acid resins and reactive basic pigments presents attractive properties, as well as in plastic compositions and impregnating compositions. More specifically, I have developed stabilized compositions containing these resins and zinc sulfide type pigments, thus making it possible to combine the many advantages of lithopone, as a pigment, and resins of this type, as the binding material, in coating compositions.

As many apparently widely different embodiments of this invention may be made without departing from the spirit and scope thereof, it is to be understood that I do not limit myself to the specific embodiments thereof except as defined in the appended claims.

I claim:

1. A non-thickening coating composition, comprising a base-sensitive polyhydric alcohol-polybasic acid resin and a stabilized zinc sulfide type of pigment which contains less than 0.1% of acetic acid soluble components, calculated as zinc oxide.

2. A non-thickening coating composition, comprising a base-sensitive polyhydric alcohol-polybasic acid resin and a stabilized zinc sulfide type of pigment which contains no more than .05% of acetic acid soluble components, calculated as zinc oxide.

3. The composition of claim 1, in which the resin is an oil modified glycerol-phthalate resin.

4. The composition of claim 2, in which the resin is an oil modified glycerol-phthalate resin.

5. The composition of claim 1, in which the resin is a linseed-China-wood modified glycerol-phthalate resin.

6. The composition of claim 2, in which the resin is a linseed-China-wood modified glycerol-phthalate resin.

In testimony whereof, I affix my signature.

GORDON D. PATTERSON.

CERTIFICATE OF CORRECTION.

Patent No. 1,889,130.   November 29, 1932.

GORDON D. PATTERSON.

It is hereby certified that error appears in the printed specification of the above numbered patent requiring correction as follows: Page 4, line 56, for "active" read "inactive"; and line 98, after "0.4" insert the word "to"; and that the said Letters Patent should be read with these corrections therein that the same may conform to the record of the case in the Patent Office.

Signed and sealed this 7th day of February, A. D. 1933.

M. J. Moore,

Acting Commissioner of Patents.

(Seal)